United States Patent
Zhang et al.

(10) Patent No.: US 11,961,239 B2
(45) Date of Patent: Apr. 16, 2024

(54) METHOD AND DEVICE FOR MARKING IMAGE POSITION OF SUB-PIXEL OF DISPLAY SCREEN, AND STORAGE MEDIUM

(71) Applicant: SEICHI TECHNOLOGIES SHENZHEN LIMITED, Shenzhen (CN)

(72) Inventors: Bin Zhang, Shenzhen (CN); Dapeng Xu, Shenzhen (CN); Yao Zhang, Shenzhen (CN)

(73) Assignee: SEICHI TECHNOLOGIES SHENZHEN LIMITED, Shenzhen (CN)

( * ) Notice: Subject to any disclaimer, the term of this patent is extended or adjusted under 35 U.S.C. 154(b) by 280 days.

(21) Appl. No.: 17/500,222

(22) Filed: Oct. 13, 2021

(65) Prior Publication Data
US 2022/0198675 A1    Jun. 23, 2022

Related U.S. Application Data

(63) Continuation of application No. PCT/CN2021/075116, filed on Feb. 3, 2021.

(30) Foreign Application Priority Data

Dec. 21, 2020    (CN) .......................... 202011521386.2

(51) Int. Cl.
*G06T 7/136*    (2017.01)
*G06T 5/00*    (2006.01)
(Continued)

(52) U.S. Cl.
CPC .............. *G06T 7/136* (2017.01); *G06T 5/002* (2013.01); *G06T 7/77* (2017.01); *G06T 7/97* (2017.01);
(Continued)

(58) Field of Classification Search
CPC ........... G06T 7/136; G06T 5/002; G06T 7/77; G06T 7/97; G06T 2207/20056;
(Continued)

(56) References Cited

U.S. PATENT DOCUMENTS

| | | | |
|---|---|---|---|
| 10,296,196 B2 | 5/2019 | Calderwood et al. | |
| 2011/0229043 A1* | 9/2011 | Kuraki | ...................... G06T 5/10 |
| | | | 382/218 |
| 2018/0300049 A1 | 10/2018 | Calderwood et al. | |

FOREIGN PATENT DOCUMENTS

| | | |
|---|---|---|
| CN | 104484878 A | 4/2015 |
| CN | 105122000 A | 12/2015 |

(Continued)

OTHER PUBLICATIONS

Deng et al., Measure Position Distortion of LED Modules with Centnroid Fitting, Advanced Display, vol. 140, pp. 233-239, China, dated Sep. 30, 2021.

(Continued)

*Primary Examiner* — Roy M Punnoose
(74) *Attorney, Agent, or Firm* — Westbridge IP LLC

(57) ABSTRACT

Disclosed are a method and a device for marking an image position of a sub-pixel of a display screen, and a storage medium. The method includes: obtaining an original image of the sub-pixel of the display screen that has been taken, marking all the sub-pixel bright points in the original image of the sub-pixel to obtain a sub-pixel mark map; searching for points to be filled among adjacent points of the bright point of each sub-pixel in the sub-pixel mark map according to the first direction pixel pitch and the second direction pixel pitch in the original image of the sub-pixel, filling the points to be filled to obtain a filling mark map; and obtaining the target sub-pixel mark map based on the sub-pixel mark map and the filling mark map.

9 Claims, 11 Drawing Sheets

(51) Int. Cl.
    *G06T 7/00*         (2017.01)
    *G06T 7/77*         (2017.01)

(52) U.S. Cl.
    CPC ............... *G06T 2207/20056* (2013.01); *G06T 2207/30168* (2013.01)

(58) Field of Classification Search
    CPC . G06T 2207/30168; G06T 2207/10024; G06T 2207/20076; G06T 2207/30121; G06T 7/0002
    USPC .................................................. 382/141, 173
    See application file for complete search history.

(56) References Cited

FOREIGN PATENT DOCUMENTS

| | | | |
|---|---|---|---|
| CN | 107706223 | A | 2/2018 |
| CN | 109175717 | A | 1/2019 |
| CN | 111882528 | A | 11/2020 |
| CN | 112258429 | A | 1/2021 |

OTHER PUBLICATIONS

First Office Action issued in counterpart Chinese Patent Application No. 202011521386.2, dated Feb. 2, 2021.
International Search Report and Written Opinion issued in corresponding PCT Application No. PCT/CN2021/075116, dated Aug. 27, 2021.

\* cited by examiner

METHOD AND DEVICE FOR MARKING IMAGE POSITION OF SUB-PIXEL OF DISPLAY SCREEN, AND STORAGE MEDIUM

CROSS-REFERENCE TO RELATED APPLICATIONS

This application is a continuation application of PCT Application No. PCT/CN2021/075116, filed on Feb. 3, 2021, which claims priority to Chinese Patent Application No. 202011521386.2, filed on Dec. 21, 2020, the entire disclosure of which are incorporated herein by reference.

TECHNICAL FIELD

The present disclosure relates to the technical field of display screens, and in particular to a method and a device for marking an image position of a sub-pixel of a display screen, and a storage medium.

BACKGROUND

In the automated optical inspection (AOI) and optical Mura (Moiré phenomenon, namely color difference that can be recognized by any human eye on the display screen) compensation of the display screen, a high-resolution camera is usually used to light up the display screen and take pictures. Each bright cluster on the image corresponds to a sub-pixel on the display. Therefore, accurately obtaining the image position of each sub-pixel and accurately corresponding the image position to the actual physical position of the display screen is the basis for correct AOI bright and dark point detection and is also a prerequisite for the correct acquisition of the brightness value of each sub-pixel in optical extractive compensation.

The existing sub-pixel positioning needs to be assisted by a positioning map (a graphics with a known pixel position that is output on the display screen). However, when the pixel arrangement of the display screen changes with the positioning map method, the sub-pixel positioning method needs to be re-adjusted. When the mobile phone screen models are different, there may be differences in the display of the positioning map, which often fails to receive sufficient detailed attention and verification, resulting in misalignment of sub-pixel positioning. Meanwhile, the technical personnel is difficult to use and the workload is relatively large.

The above contents are only used to assist the understanding of the technical solutions of the present disclosure, which does not mean that the above contents are recognized as prior art.

SUMMARY

The embodiments of the present disclosure provide a method and a device for marking an image position of a sub-pixel of a display screen, and a storage medium, which aims to solve the problem of easy misalignment when using the positioning map to locate the sub-pixel of the display screen, and solve the problem that the technical personnel is difficult to use and the workload is relatively large.

The embodiments of the present disclosure provide a method for marking an image position of a sub-pixel of a display screen, including:

obtaining an original image of the sub-pixel of the display screen that has been taken, and performing average filtering and binarization processing on the original image of the sub-pixel to obtain a first image with noise removed;

performing a first local threshold segmentation on the original sub-pixel image to obtain a second image with an interference pixel removed; the interference pixel including at least one of a dust-covered point and a defective pixel point;

performing a first convolution operation and a second local threshold segmentation on the original image of the sub-pixel to obtain a third image with specific morphological characteristics;

performing a second convolution operation and a third local threshold segmentation on the original image of the sub-pixel to obtain a fourth image with specific morphological characteristics;

performing a second convolution operation and a local maximum mark on the original image of the sub-pixel to obtain a fifth image;

performing an intersection operation on the first image, the second image, the third image, and the fourth image to obtain an intermediate image with specific morphological characteristics that removes noise and the interference pixel;

performing an intersection operation on the intermediate image and the fifth image to obtain a sub-pixel mark map that includes all sub-pixel bright points;

searching for points to be filled among adjacent points of the bright point of each sub-pixel in the sub-pixel mark map according to a first direction pixel pitch and a second direction pixel pitch in the original image of the sub-pixel, filling the points to be filled until the points to be filled do not exist in the original image of the sub-pixel, to obtain a filling mark map; and obtaining a target sub-pixel mark map based on the sub-pixel mark map and the filling mark map.

In some embodiments, the adjacent points of the bright point of the sub-pixel include adjacent points that are separated from the bright point of the sub-pixel by the first direction pixel pitch in the first direction, and adjacent points that are separated from the bright point of the sub-pixel by the second direction pixel pitch in the second direction; the first direction is perpendicular to the second direction.

In some embodiments, the method further includes:

calculating the first direction pixel pitch and the second direction pixel pitch from the original image of the sub-pixel.

In some embodiments, the operation of calculating the first direction pixel pitch and the second direction pixel pitch from the original image of the sub-pixel includes:

preprocessing the original image of the sub-pixels to obtain a pixel area map meeting row and column distribution characteristics of the sub-pixel;

performing Fourier transform and decentralization processing on the pixel area map to obtain a target spectrogram; and performing maximum period detection on a real part of the target spectrogram to obtain the first direction pixel pitch and the second direction pixel pitch.

In some embodiments, the operation of searching for points to be filled among adjacent points of the bright point of each sub-pixel in the sub-pixel mark map according to a first direction pixel pitch and a second direction pixel pitch in the original image of the sub-pixel, filling the points to be filled until the points to be filled do not exist in the original image of the sub-pixel, to obtain a filling mark map includes:

searching for empty points among the adjacent points of the bright point of each sub-pixel in the sub-pixel mark map according to the first direction pixel pitch and the second direction pixel pitch, and screening the empty points to obtain the points to be filled, to generate a first mark map;

if a number of points to be filled is less than or equal to zero, using the first mark map as the filling mark map; if the number of points to be filled is greater than zero, filling the points to be filled in the first mark map, and using the filled point as the bright point of the sub-pixel; and updating the filled first mark map to the sub-pixel mark map, returning to the operation of searching for the empty points among the adjacent points of the bright point of each sub-pixel in the sub-pixel mark map according to the first direction pixel pitch and the second direction pixel pitch, and screening the empty points to obtain the points to be filled, to generate the first mark map.

In some embodiments, the operation of screening the empty points to obtain the points to be filled includes:

marking the empty points with the number of bright points of 2 to 4 in the sub-pixel adjacent to the empty points in the first direction and the second direction as the points to be filled; and marking the empty points with the number of bright point of 1 in the sub-pixel adjacent to the empty points in the first direction and the second direction as the points not to be filled.

In some embodiments, the operation of obtaining a target sub-pixel mark map based on the sub-pixel mark map and the filling mark map includes:

performing a union operation on the sub-pixel mark map and the filling mark map to obtain the target sub-pixel mark map.

The present disclosure further provides a device for marking an image position of a sub-pixel of a display screen, including a processor, a memory electrically connected to the processor, and a program for marking the image position of the sub-pixel of the display screen stored on the memory and executable on the processor, when the program is executed by the processor, the operations of the method for marking the image position of the sub-pixel of the display screen described above are implemented.

The present disclosure further provides a non-transitory computer readable storage medium, the non-transitory computer readable storage medium stores one or more programs, the one or more programs are executed by one or more processors to implement the operations of the method for marking the image position of the sub-pixel of the display screen described above.

The present disclosure provide a method for marking an image position of a sub-pixel of a display screen, including: marking all the sub-pixel bright points in the original image of the sub-pixel to obtain a sub-pixel mark map; searching for points to be filled among adjacent points of the bright point of each sub-pixel in the sub-pixel mark map according to the first direction pixel pitch and the second direction pixel pitch in the original image of the sub-pixel, filling the points to be filled to obtain a filling mark map; and obtaining the target sub-pixel mark map based on the sub-pixel mark map and the filling mark map. The embodiment of the present disclosure does not require the assistance of the positioning map, which reduces the use difficulty and the workload of operation, and by filling in the points to be filled adjacent to the bright points of all sub-pixels in the target sub-pixel mark map into sub-pixel bright points, this embodiment realizes the filling of the empty mark positions of the sub-pixels in the original image due to foreign object occlusion and pixel dead pixels, which can accurately mark the normal sub-pixel points, the location of the sub-pixel bad points caused by foreign matter occlusion and pixel bad points, and improve the anti-interference ability against dust, foreign objects, pixel bad points, or the like. In addition, this embodiment can also reduce the risk of sub-pixel positioning errors in subsequent AOI bright and dark point detection and optical extraction compensation.

DETAILED DESCRIPTION OF THE EMBODIMENTS

In order to better understand the above technical solutions, the exemplary embodiments of the present disclosure will be described in more detail below with reference to the accompanying drawings. Although the drawings show exemplary embodiments of the present disclosure, it should be understood that the present disclosure can be implemented in various forms and should not be limited by the embodiments set forth herein. On the contrary, these embodiments are provided to enable a more thorough understanding of the present disclosure and to fully convey the scope of the present disclosure to those skilled in the art.

Sub-pixel: Each pixel on a display screen is composed of the three primary colors of red, green and blue (RGB), and each color on each pixel is called a sub-pixel.

In the automated optical inspection (AOI) and optical Mura (Moiré phenomenon, that is, color difference that can be recognized by any human eye on the display screen) compensation of the display screen, a high-resolution camera is usually used to light up the display screen and take pictures. Each bright cluster on the image corresponds to a sub-pixel on the display. Therefore, accurately obtaining the image position of each sub-pixel and accurately corresponding the image position to the actual physical position of the display screen is the basis for correct AOI bright and dark point detection, and is also a prerequisite for the correct acquisition of the brightness value of each sub-pixel in optical extractive compensation.

The existing sub-pixel positioning needs to be assisted by a positioning map (a graphics with a known pixel position that is output on the display screen). However, when the pixel arrangement of the display screen changes with the positioning map method, the sub-pixel positioning method needs to be re-adjusted. When the mobile phone screen models are different, there may be differences in the display of the positioning map, which often fails to receive sufficient detailed attention and verification, resulting in misalignment of sub-pixel positioning. Meanwhile, the difficulty and workload of technical personnel are also relatively large.

Therefore, it is necessary to solve the problem of easy misalignment when using the positioning map to locate the sub-pixels of the display screen, and solve the problem that the technical staff is difficult to use and the workload is relatively large in the existing method. The present disclosure provides a method and a device for marking an image position of a sub-pixel of a display screen, and a storage medium.

Figure 1:
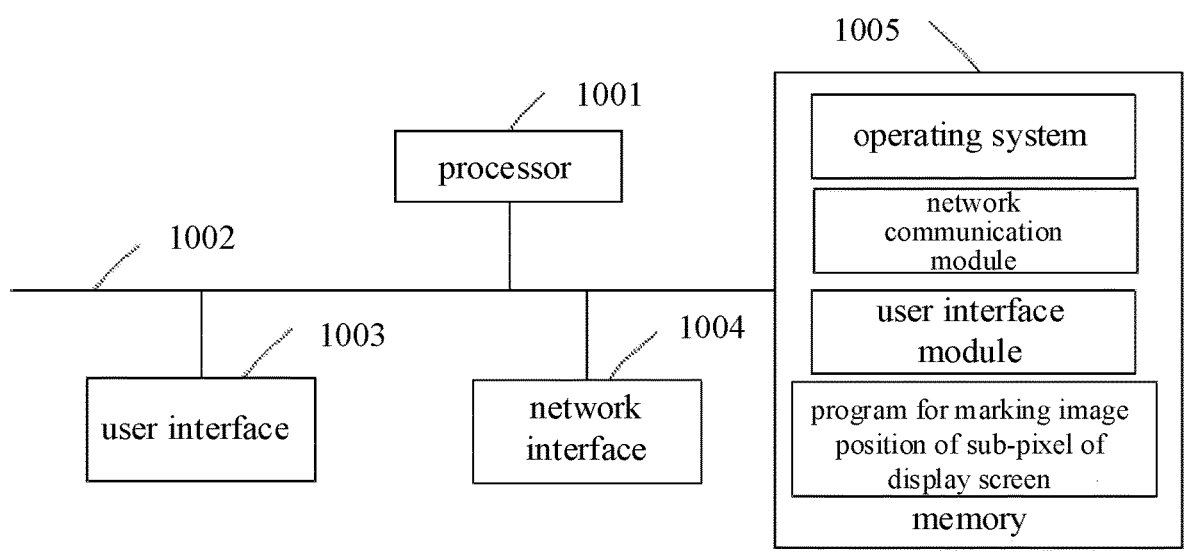
FIG. 1 is a hardware architecture diagram of a display device according to an embodiment of the present disclosure.

As shown in FIG. 1, FIG. 1 shows a device for marking an image position of a sub-pixel of a display screen. The device can include a processor 1001, such as a CPU, a memory 1005, a user interface 1003, a network interface 1004, and a communication bus 1002. The communication bus 1002 is configured to implement communication between the components. The user interface 1003 can include a display, an input unit such as a keyboard. The user interface 1003 can also include a standard wired interface and a wireless interface. The network interface 1004 can further include a standard wired interface and a wireless interface (such as a WI-FI interface). The memory 1005 can be a high-speed random access memory (RAM) or a non-volatile memory, such as a magnetic disk memory. The memory 1005 can also be a storage device independent of the foregoing processor 1001.

Those skilled in the art can understand that the structure of the device for marking the image position of the sub-pixel of the display screen shown in FIG. 1 does not constitute a limitation on the device, and can include more or fewer components, a combination of some components, or differently arranged components than shown in the figure.

Figure 4:
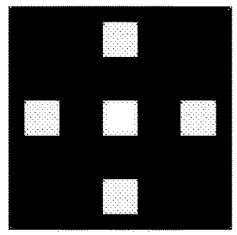
FIG. 4 shows a schematic diagram of a complete mark point according to an embodiment of the present disclosure.
Figure 5A:
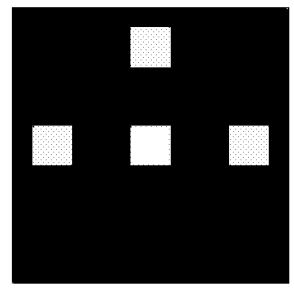
FIG. 5a to FIG. 5d show schematic diagrams of three adjacent mark points according to an embodiment of the present disclosure.
Figure 5B:
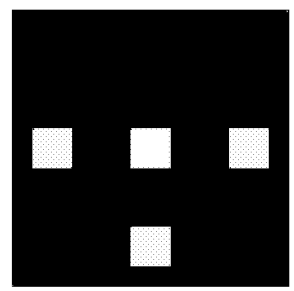
Figure 5C:
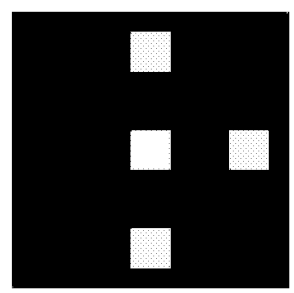
Figure 5D:
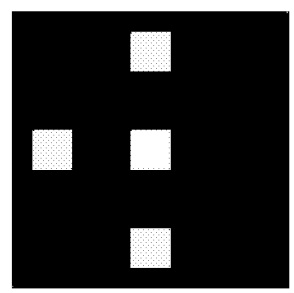
Figure 6A:
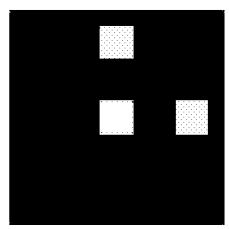
FIG. 6a to FIG. 6f show schematic diagrams of two adjacent mark points according to an embodiment of the present disclosure.
Figure 6B:
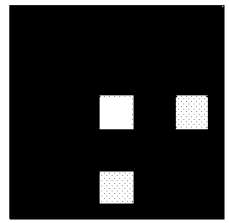
Figure 6C:
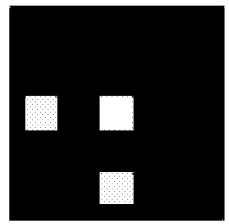
Figure 6D:
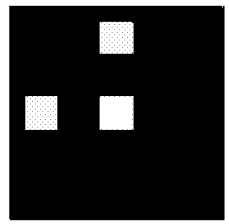
Figure 6E:
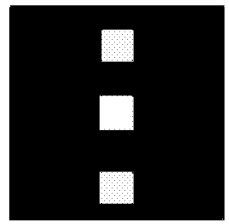
Figure 6F:
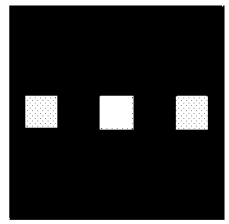
Figure 7A:
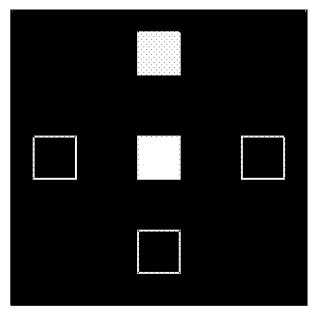
FIG. 7a to FIG. 7d show schematic diagrams of single-adjacent mark points according to an embodiment of the present disclosure.
Figure 7B:
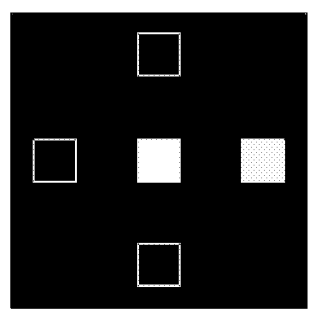
Figure 7C:
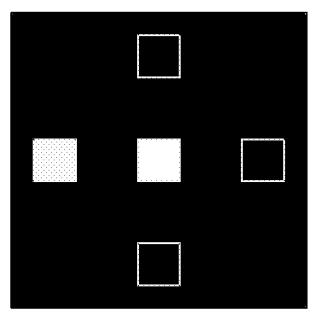
Figure 7D:
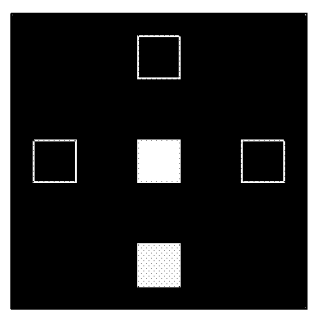

As shown in FIG. 4, the memory 1005 as a computer storage medium can include an operating system, a network communication module, a user interface module, and a program for marking the image position of the sub-pixel of the display screen. The operating system is a program that manages and controls the hardware and software resources of the terminal device, and supports the operation of the program for marking the image position of the sub-pixel of the display screen and other software or programs.

In the terminal device shown in FIG. 1, the user interface 1003 is mainly used to obtain the original image of the sub-pixel of the display screen that has been taken. The network interface 1004 is mainly used for the back-end server, and performs data communication with the back-end server. The processor 1001 can be used to call the program for marking the image position of the sub-pixel of the display screen stored in the memory 1005, and execute the operations of the method for marking the image position of the sub-pixel of the display screen as described above.

In some embodiments, the processor 1001 can call the program for marking the image position of the sub-pixel of the display screen stored in the memory 1005, and perform the following operations of the method for marking the image position of the sub-pixel of the display screen:

obtaining an original image of the sub-pixel of the display screen that has been taken, and performing average filtering and binarization processing on the original image of the sub-pixel to obtain a first image with noise removed;

performing a first local threshold segmentation on the original sub-pixel image to obtain a second image with an interference pixel removed; the interference pixel comprising at least one of a dust-covered point and a defective pixel point;

performing a first convolution operation and a second local threshold segmentation on the original image of the sub-pixel to obtain a third image with specific morphological characteristics;

performing a second convolution operation and a third local threshold segmentation on the original image of the sub-pixel to obtain a fourth image with specific morphological characteristics;

performing a second convolution operation and a local maximum mark on the original image of the sub-pixel to obtain a fifth image;

performing an intersection operation on the first image, the second image, the third image, and the fourth image to obtain an intermediate image with specific morphological characteristics that removes noise and the interference pixel;

performing an intersection operation on the intermediate image and the fifth image to obtain a sub-pixel mark map that comprises all sub-pixel bright points;

searching for points to be filled among adjacent points of the bright point of each sub-pixel in the sub-pixel mark map according to a first direction pixel pitch and a second direction pixel pitch in the original image of the sub-pixel, filling the points to be filled until the points to be filled do not exist in the original image of the sub-pixel, to obtain a filling mark map; and obtaining a target sub-pixel mark map based on the sub-pixel mark map and the filling mark map.

In some embodiments, the processor 1001 can call the program for marking the image position of the sub-pixel of the display screen stored in the memory 1005, and perform the following operations of the method for marking the image position of the sub-pixel of the display screen:

the adjacent points of the bright point of the sub-pixel include adjacent points that are separated from the bright point of the sub-pixel by the first direction pixel pitch in the first direction, and adjacent points that are separated from the bright point of the sub-pixel by the second direction pixel pitch in the second direction; the first direction is perpendicular to the second direction.

In some embodiments, the processor 1001 can call the program for marking the image position of the sub-pixel of the display screen stored in the memory 1005, and perform the following operations of the method for marking the image position of the sub-pixel of the display screen:

calculating the first direction pixel pitch and the second direction pixel pitch from the original image of the sub-pixel.

In some embodiments, the processor 1001 can call the program for marking the image position of the sub-pixel of the display screen stored in the memory 1005, and perform the following operations of the method for marking the image position of the sub-pixel of the display screen:

preprocessing the original image of the sub-pixels to obtain a pixel area map meeting row and column distribution characteristics of the sub-pixel;
performing Fourier transform and decentralization processing on the pixel area map to obtain a target spectrogram; and
performing maximum period detection on a real part of the target spectrogram to obtain the first direction pixel pitch and the second direction pixel pitch.

In some embodiments, the processor 1001 can call the program for marking the image position of the sub-pixel of the display screen stored in the memory 1005, and perform the following operations of the method for marking the image position of the sub-pixel of the display screen:

searching for empty points among the adjacent points of the bright point of each sub-pixel in the sub-pixel mark map according to the first direction pixel pitch and the second direction pixel pitch, and screening the empty points to obtain the points to be filled, to generate a first mark map;
if a number of points to be filled is less than or equal to zero, using the first mark map as the filling mark map;
if the number of points to be filled is greater than zero, filling the points to be filled in the first mark map, and using the filled point as the bright point of the sub-pixel; and
updating the filled first mark map to the sub-pixel mark map, returning to the operation of searching for the empty points among the adjacent points of the bright point of each sub-pixel in the sub-pixel mark map according to the first direction pixel pitch and the second direction pixel pitch, and screening the empty points to obtain the points to be filled, to generate the first mark map.

In some embodiments, the processor 1001 can call the program for marking the image position of the sub-pixel of the display screen stored in the memory 1005, and perform the following operations of the method for marking the image position of the sub-pixel of the display screen:

marking the empty points with the number of bright points of 2 to 4 in the sub-pixel adjacent to the empty points in the first direction and the second direction as the points to be filled; and
marking the empty points with the number of bright point of 1 in the sub-pixel adjacent to the empty points in the first direction and the second direction as the points not to be filled.

In some embodiments, the processor 1001 can call the program for marking the image position of the sub-pixel of the display screen stored in the memory 1005, and perform the following operations of the method for marking the image position of the sub-pixel of the display screen:

performing a union operation on the sub-pixel mark map and the filling mark map to obtain the target sub-pixel mark map.

Figure 2:
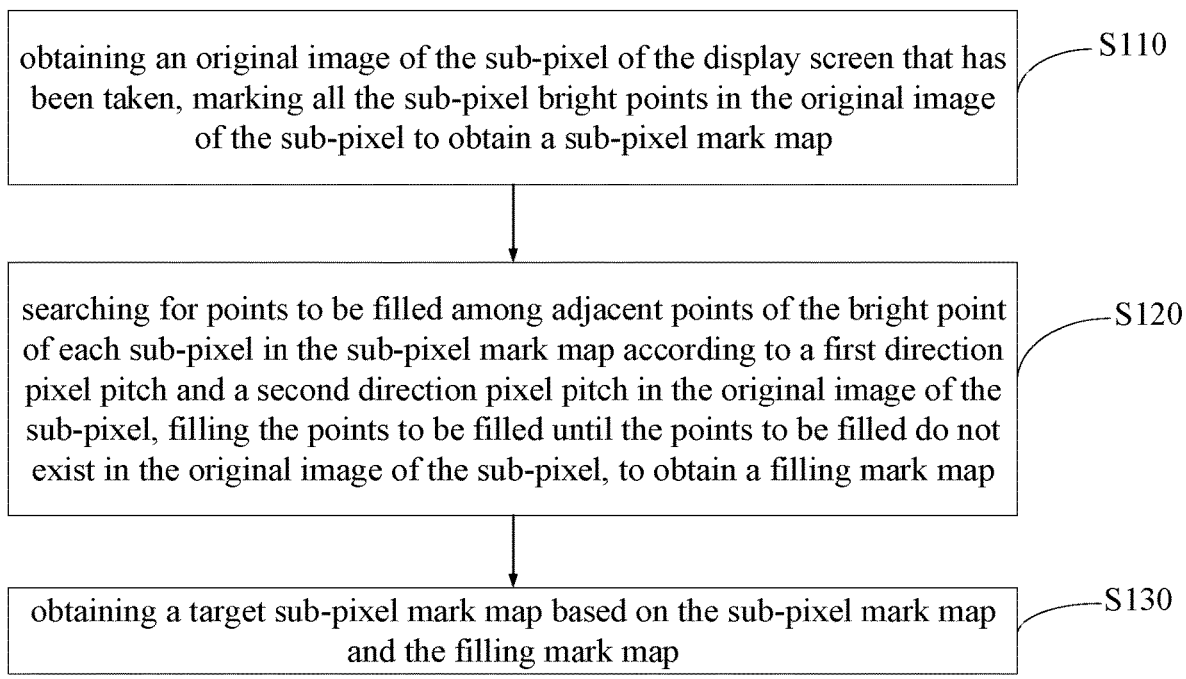
FIG. 2 is a flowchart of a method for marking an image position of a sub-pixel of a display screen according to a first embodiment of the present disclosure.

As shown in FIG. 2, based on the hardware architecture of the device for marking the image position of the sub-pixel of the display screen, the method for marking the image position of the sub-pixel of the display screen of the present disclosure is proposed below. The method for marking the image position of the sub-pixel of the display screen in this embodiment is applicable to a variety of display screens, such as liquid crystal display screens (abbreviated as LCD screens), organic light emitting diode display screens (abbreviated as OLED screens), or the like.

The method for marking the image position of the sub-pixel of the display screen includes:

S110, obtaining an original image of the sub-pixel of the display screen that has been taken, marking all the sub-pixel bright points in the original image of the sub-pixel to obtain a sub-pixel mark map.

In the existing method, when the positioning map marking method is used, the display screen needs to light up a specific positioning map, and only after accurately obtaining the position of the pixel on the positioning map, can the subsequent sub-pixel positioning be processed. If the bright clusters of pixels in the captured positioning map have different brightness and darkness, the sub-pixel positioning on the entire display screen will be deviated, which will cause large errors in AOI bright and dark point detection and optical extraction compensation. Therefore, in this embodiment, it is necessary to accurately mark all the sub-pixel bright points in the original image of the sub-pixel to obtain the sub-pixel mark map.

Figure 13:
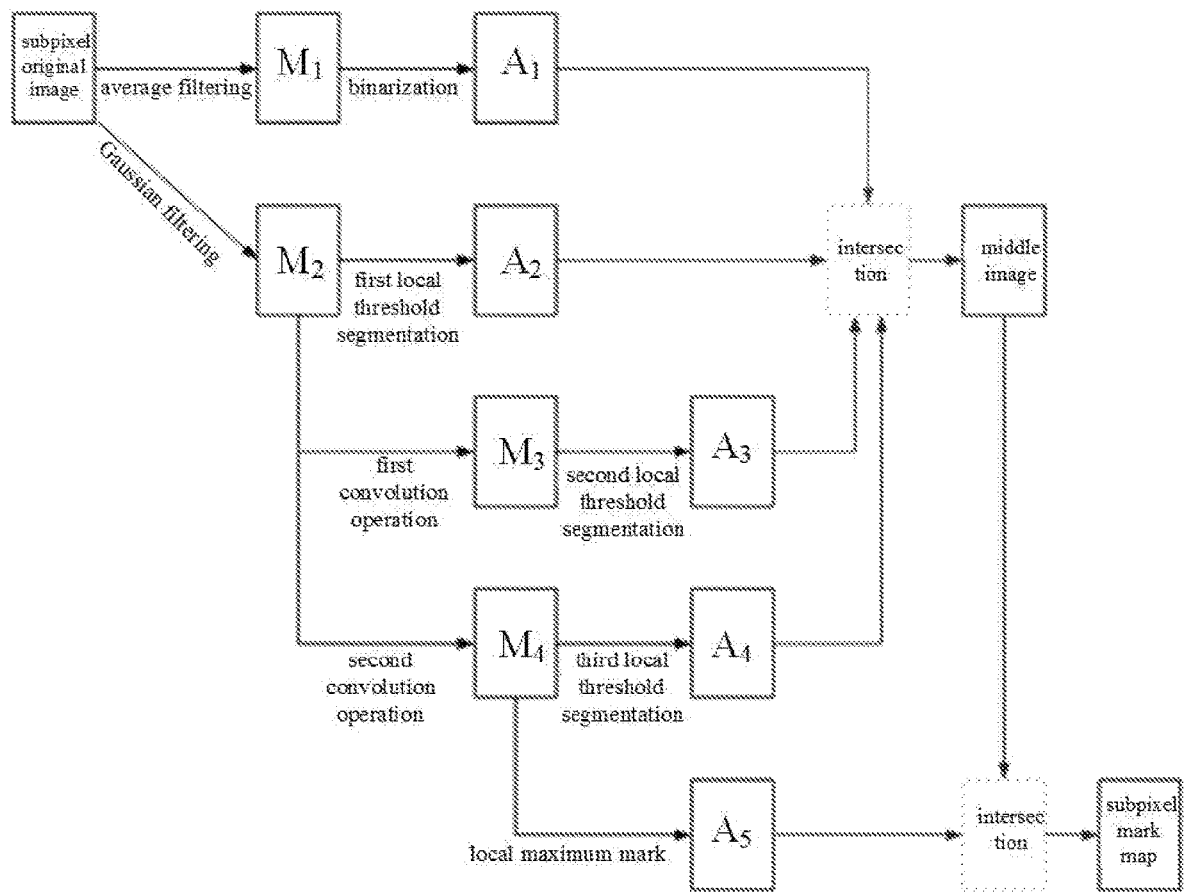
FIG. 13 shows a step diagram of obtaining a sub-pixel mark map according to an embodiment of the present disclosure.
Figure 14:
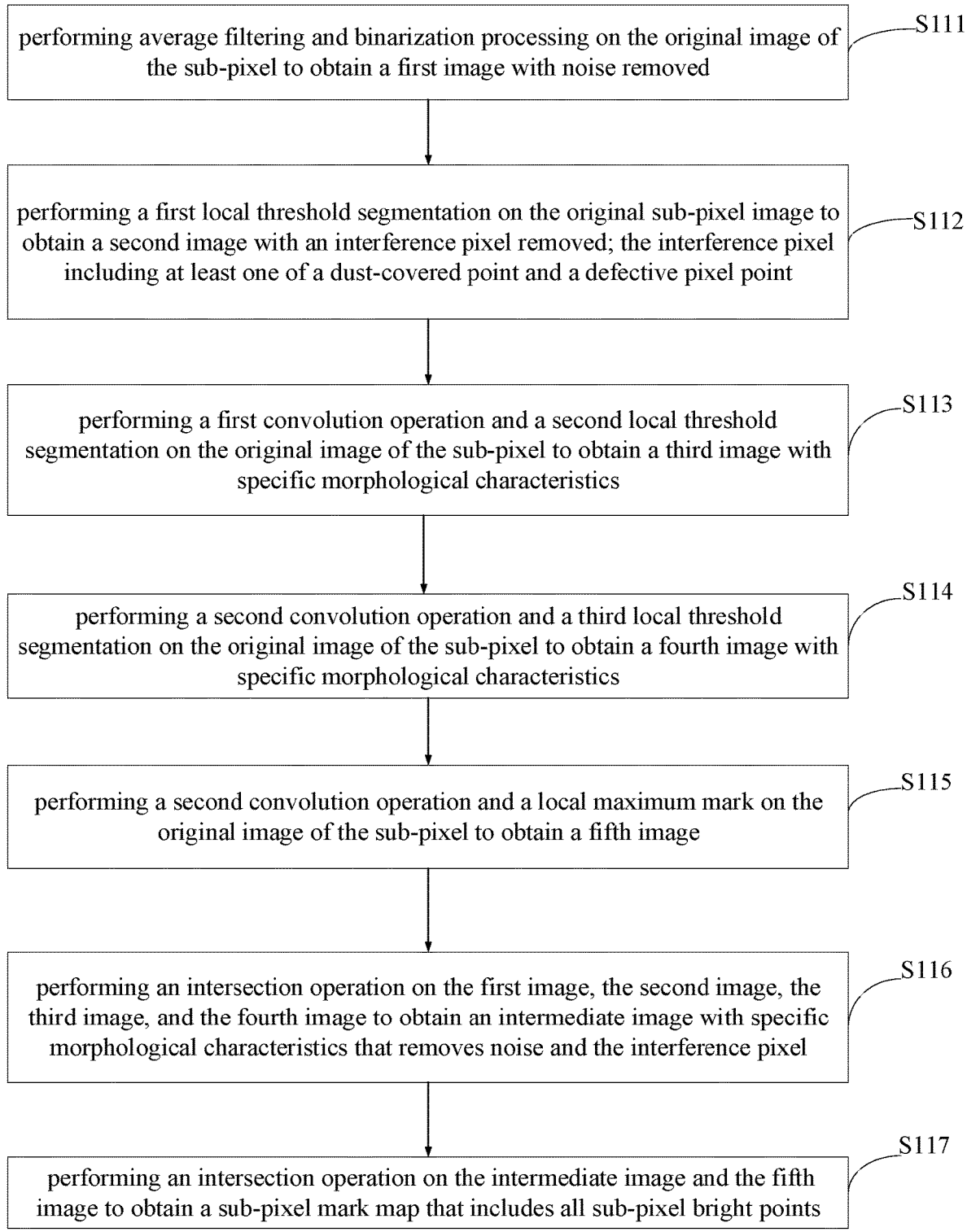
FIG. 14 shows a flowchart of marking the bright points of all sub-pixels in the original image of the sub-pixels to obtain a sub-pixel mark map according to an embodiment of the present disclosure.

As shown in FIG. 13 and FIG. 14, the operation of marking all the sub-pixel bright points in the original image of the sub-pixel to obtain a sub-pixel mark map includes:

S111, performing average filtering and binarization processing on the original image of the sub-pixel to obtain a first image with noise removed.

Actually, the captured original image of the sub-pixel may have abnormally displayed bright clusters of pixels due to noise. If bright clusters of pixels appear where there should be no bright clusters of pixels, it will cause errors in the subsequent AOI bright and dark point detection. The brightness of the bright clusters of pixels that are abnormally displayed due to noise is low. Therefore, in this embodiment, the average filter can be used to realize the shielding of the bright clusters of abnormal display pixels caused by noise.

Specially, a $S_1 \times S_1$ average filter is performed on the original image of the sub-pixel to obtain the filtered image M1, T1 is used as a threshold to binarize M1, and the values of pixels larger than T1 are taken as 255, and the values of other pixels are taken as 0 to obtain the first image A1. In this embodiment, the preferred values of S1 and T1 are respectively: S1=3, T1=12.

The mean filter operator is shown in the following formula:

$$M_1(i, j) = \frac{1}{S_1 \times S_1} \sum_{m=-S_1/2}^{m=S_1/2} \sum_{n=-S_1/2}^{n=S_1/2} I(i+m, j+n)$$

The calculation formula for binarization is as follows:

$$A_1(i, j) = \begin{cases} 255 & M_1(i, j) > T_1 \\ 0 & \text{otherwise} \end{cases}$$

In this operation, through the threshold of T1, the noise with too dark brightness is removed, and all the bright points of the sub-pixels that are normally displayed on the screen can be segmented.

S112, performing a first local threshold segmentation on the original sub-pixel image to obtain a second image with an interference pixel removed; the interference pixel including at least one of a dust-covered point and a defective pixel point.

In order to obtain the second image with the interference pixel removed, this operation also includes the following subdividing operations: performing a Gaussian filter of S2×S2 once on the original image of the sub-pixel to obtain an image M2; and using an S3×S3 rectangular window to perform the first local threshold segmentation on the image M2 to obtain a segmented second image A2.

In an embodiment, S2 is equal to 3. The Gaussian filter integral template is as follows:

| 1/16 | 1/8 | 1/16 |
|------|-----|------|
| 1/8  | 1/4 | 1/8  |
| 1/16 | 1/8 | 1/16 |

In an embodiment, S3 is equal to 5, µ is equal to 0.02, the method of local threshold segmentation is as follows:

$$A_2(i, j) = \begin{cases} 255 & M_2(i, j) > \mu \cdot T(i, j) \\ 0 & \text{otherwise} \end{cases}$$

T is a mean image of S3×S3, as shown in the following formula, µ is a floating point number with a value between (0, 2).

$$T(i, j) = \frac{1}{S_3 \times S_3} \sum_{m=-S_3/2}^{m=S_3/2} \sum_{n=-S_2/2}^{n=S_3/2} M_2(i+m, j+n)$$

Through operation S1121, the sub-pixel bright points in the original image of the sub-pixels that are larger than the local threshold can be extracted, which lays a foundation for the subsequent extraction of all sub-pixel bright points in the original image of the sub-pixels.

S113, performing a first convolution operation and a second local threshold segmentation on the original image of the sub-pixel to obtain a third image with specific morphological characteristics.

Specially, the S4×S4 convolution template (in an embodiment, S4 is equal to 5, the outermost 1-2 circle takes the value 1, and the rest take the value 0) is used to perform the first convolution operation on the image M2, and the average of the convolution results is taken to obtain the image M3, then the local threshold segmentation method is used to perform the second local threshold segmentation on M3 to obtain the third image A3.

The convolution template is J1, and the convolution template J1 is expressed as follows:

$$J_1 = \begin{bmatrix} 1 & 1 & 1 & 1 & 1 \\ 1 & 0 & 0 & 0 & 1 \\ 1 & 0 & 0 & 0 & 1 \\ 1 & 0 & 0 & 0 & 1 \\ 1 & 1 & 1 & 1 & 1 \end{bmatrix}$$

The calculation formula of image M3 is as follows:

$$M3 = M2 * J1$$

The calculation formula for the third image A3 is as follows:

$$A_3(i, j) = \begin{cases} 255 & M_3(i, j) > \mu \cdot T(i, j) \\ 0 & \text{otherwise} \end{cases}$$

T is the mean image of S5×S5 on the image M3, as shown in the following formula:

$$T(i, j) = \frac{1}{S_5 \times S_5} \sum_{m=-S_5/2}^{m=S_5/2} \sum_{n=-S_5/2}^{n=S_5/2} M_3(i+m, j+n)$$

The recommended value is S5=5, µ=0.02.

S114, performing a second convolution operation and a third local threshold segmentation on the original image of the sub-pixel to obtain a fourth image with specific morphological characteristics.

Specially, the S6×S6 convolution template (in an embodiment, S6 is equal to 3, all values are 1) is used to perform the second convolution operation on the image M2, and the average of the convolution results is taken to obtain the image M4, then the local threshold segmentation method is used to perform the third local threshold segmentation on M4 to obtain the third image A4.

The convolution template is J2, and the convolution template J2 is expressed as follows:

$$J_2 = \begin{bmatrix} 1 & 1 & 1 \\ 1 & 1 & 1 \\ 1 & 1 & 1 \end{bmatrix}$$

The calculation formula for the image M4 is as follows:

$$M4 = M2 * J2$$

The local threshold segmentation method is the same as the operation 1122, except that the width of the local window is S7 and the value of µ is different. The recommended value here is S7=5, µ=0.02.

S115, performing a second convolution operation and a local maximum mark on the original image of the sub-pixel to obtain a fifth image.

In this embodiment, the fifth image A5 is obtained by marking the local maximum value on the basis of the image M4. Specifically, the local maximum value marking of 8 neighborhoods is performed on the image M4, and the marking algorithm is as follows:

$$A_S(i, j) =$$
$$\begin{cases} 255 & M_4(i, j) \geq \mathrm{Mx}_{M_4}^{local}(i, j) \, \underline{\mathbb{H}} \, (\mathrm{Mx}_{M_3}^{local}(i, j) - \mathrm{Mn}_3^{local}(i, j)) > T_3 \\ 0 & \text{otherwise} \end{cases}$$

$$\mathrm{Mx}_{M_4}^{local}(i, j) = \max\{M_4(i+m, j+n)\}, m, n \in [-1, 1]$$

$$\mathrm{Mn}_{M_4}^{local}(i, j) = \min\{M_4(i+m, j+n)\}, m, n \in [-1, 1]$$

The preferred value of T3 is 13.

Through operation S115, the local maximum position of the image M4 can be obtained.

S116, performing an intersection operation on the first image, the second image, the third image A3, and the fourth image A4 to obtain an intermediate image with specific morphological characteristics that removes noise and the interference pixel.

S117, performing an intersection operation on the intermediate image and the fifth image to obtain a sub-pixel mark map that includes all sub-pixel bright points.

The first image and the second image are subjected to an intersection operation to obtain an image with noise removed and sub-pixel bright points extracted, and then the third image A3 and the fourth image A4 are subjected to an intersection operation. The purpose is to extract a sub-pixel bright cluster with a specific shape feature that is bright in the middle and a dark circle on the periphery of the original image of the sub-pixel, and obtain its center position. In this embodiment, the bright cluster with a specific shape feature is that 3*3=9 sub-pixels in the middle are bright, and the sub-pixels that extend out by one row or column are dark bright clusters. It is understandable that bright clusters with different shape characteristics can be obtained based on different convolution templates. In other embodiments, it can also be different specific shape features, for example, 4*4=16 sub-pixels in the middle are bright, and the sub-pixels that extend out by one row or column are dark bright clusters, or the like.

The first image with noise removed and the second image with interference pixels removed are intersected, and then intersected with the third image and the fourth image from which specific shape features are extracted, to obtain an intermediate image with specific shape characteristics without noise and interference pixels. An intersection operation is performed between the intermediate image and the fifth image labeled with local maximums to obtain a sub-pixel mark map containing the bright points of all sub-pixels. Based on image morphology and logical operations, this embodiment can accurately mark the positions of the sub-pixels on the image that were originally display screens. This operation can realize the bright point marking of the sub-pixels and better overcome the influence of noise and interfering pixels.

S120, searching for points to be filled among adjacent points of the bright point of each sub-pixel in the sub-pixel mark map according to a first direction pixel pitch and a second direction pixel pitch in the original image of the sub-pixel, filling the points to be filled until the points to be filled do not exist in the original image of the sub-pixel, to obtain a filling mark map.

Due to the fact that there are foreign objects on the surface of the display screen or camera lens during the actual capturing process, and the sub-pixels of the display screen may have dark points, defective points, or the like, the sub-pixel mark map marked in operation S110 does not necessarily include all the sub-pixel positions of the display screen, and there may be some empty mark positions due to occlusion by foreign objects and defective pixels. These positions should have sub-pixels. Therefore, the corresponding positions need to be filled in the next operation.

Specially, the operation S120 includes:

S121, searching for empty points among the adjacent points of the bright point of each sub-pixel in the sub-pixel mark map according to the first direction pixel pitch and the second direction pixel pitch, and screening the empty points to obtain the points to be filled, to generate a first mark map.

The adjacent points of the bright point of the sub-pixel include adjacent points that are separated from the bright point of the sub-pixel by the first direction pixel pitch in the first direction, and adjacent points that are separated from the bright point of the sub-pixel by the second direction pixel pitch in the second direction; the first direction is perpendicular to the second direction. The adjacent points of the bright point of the sub-pixel include the adjacent points of the bright point of the sub-pixel in the upper, lower, left, and right positions.

In order to more quickly mark the types of adjacent points of the bright point of the sub-pixel, and to facilitate subsequent filling of the points to be filled, this step also includes marking the bright point of the sub-pixel. The specific marking method is as follows:

As shown in FIG. 4, the sub-pixel bright points with one sub-pixel bright point in the center and four sub-pixel bright points around are called complete mark points, and Flag is set to 5.

As shown in FIG. 5a to FIG. 5d, the sub-pixel bright points with one sub-pixel bright point in the center and three sub-pixel bright points around (that is, the 3 sub-pixel bright points around the sub-pixel bright point in the center of the figure) are called 3 adjacent mark points, and Flag is set to 4.

As shown in FIG. 6a to FIG. 6f, the sub-pixel bright points with one sub-pixel bright point in the center and two sub-pixel bright points around are called 2 adjacent mark points, and Flag is set to 3.

As shown in FIG. 7a to FIG. 7d, the sub-pixel bright points with one sub-pixel bright point in the center and only one sub-pixel bright point around are called single-adjacent mark points, and Flag is set to 2.

Figure 8:
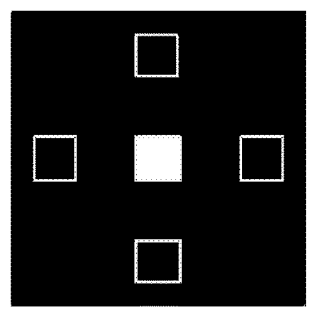
FIG. 8 shows a schematic diagram of isolated noise point according to an embodiment of the present disclosure.
Figure 9A:
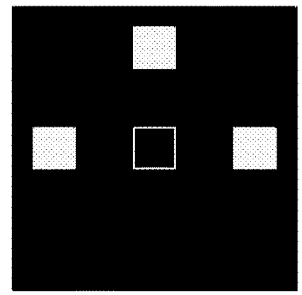
FIG. 9a to FIG. 9d show schematic diagrams of empty points including three sub-pixel bright points around the empty points according to an embodiment of the present disclosure.
Figure 9B:
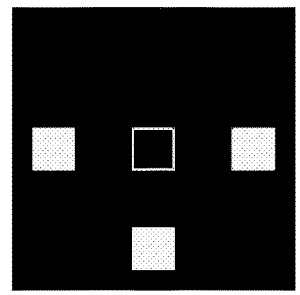
Figure 9C:
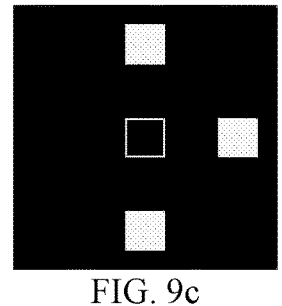
Figure 9D:
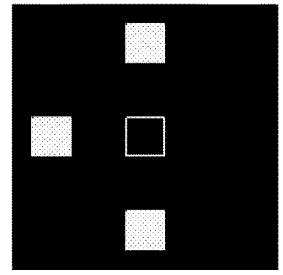
Figure 10A:
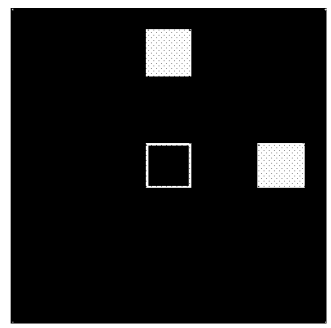
FIG. 10a to FIG. 10d show schematic diagrams of empty points including two sub-pixel bright points around the empty points according to an embodiment of the present disclosure.
Figure 10B:
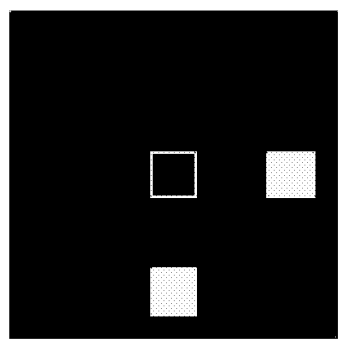
Figure 10C:
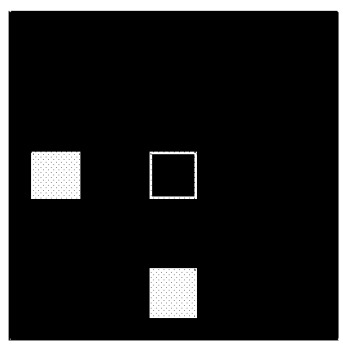
Figure 10D:
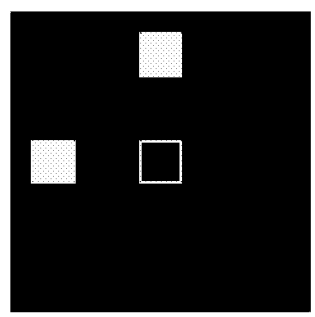
Figure 11A:
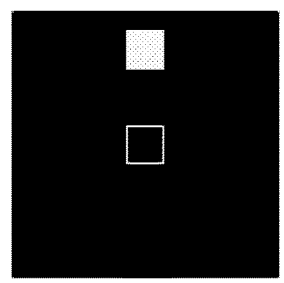
FIG. 11a to FIG. 11d show schematic diagrams of empty points including only one sub-pixel bright point around the empty points according to an embodiment of the present disclosure.
Figure 11B:
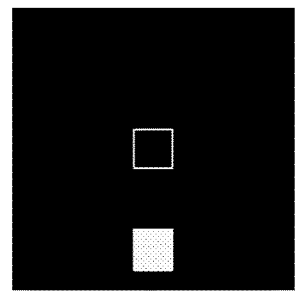
Figure 11C:
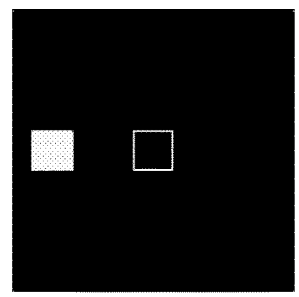
Figure 11D:
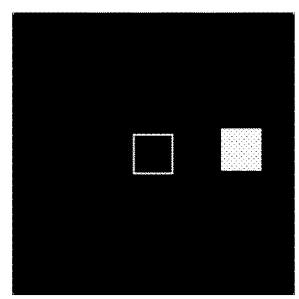

As shown in FIG. 8, the sub-pixel bright point with one sub-pixel bright point in the center and no sub-pixel bright points around is called isolated noise point, and Flag is set to 1.

It can be seen that, since there are no empty points around the complete mark points, it is only necessary to look for empty points around the mark points with Flag less than or equal to 4 (i.e., 3 adjacent mark points, 2 adjacent mark points, single-adjacent mark points, and isolated noise point). The points to be filled are screened from the empty points, including: marking the empty points with the number of bright points of 2 to 4 in the sub-pixel adjacent to the empty points in the first direction and the second direction as the points to be filled; and marking the empty points with the number of bright point of 1 in the sub-pixel adjacent to the empty points in the first direction and the second direction as the points not to be filled.

Specifically, there are the following types of adjacent points of empty points.

As shown in FIG. 9a to FIG. 9d, the empty point that contains three sub-pixel bright points around the empty point needs to be filled, and Flag is set to 3.

As shown in FIG. 10a to FIG. 10d, the empty point that contains two sub-pixel bright points around the empty point needs to be filled, and Flag is set to 2.

As shown in FIG. 11a to FIG. 11d, the empty point that contains only one sub-pixel bright point around the empty point does not need to be filled, and Flag is set to 1.

Figure 12:
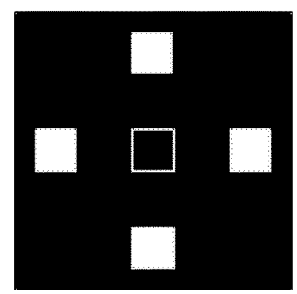
FIG. 12 shows a schematic diagram of empty points including four sub-pixel bright points around the empty points according to an embodiment of the present disclosure.

As shown in FIG. 12, the empty point that contains four sub-pixel bright points around the empty point needs to be filled, and Flag is set to 4.

It can be seen that the empty points with 2 to 4 sub-pixel bright points around the empty points may be caused by the occlusion of foreign objects and the empty mark positions caused by the defective pixels. Therefore, the above-mentioned empty point is a point to be filled, and the above-mentioned empty point needs to be filled. However, there is only one sub-pixel bright point around the empty point, and only one adjacent position is the sub-pixel bright point, the bright point of the sub-pixel may be the edge point of the bright cluster in the original image of the sub-pixel, so there is no need to fill in the empty points in this situation, and it is the point that does not need to be filled.

S122, if a number of points to be filled is less than or equal to zero, using the first mark map as the filling mark map; if the number of points to be filled is greater than zero, filling the points to be filled in the first mark map, and using the filled point as the bright point of the sub-pixel. If the number of points to be filled is less than or equal to zero, it means that there are no points to be filled that need to be filled in the first mark map, and the first mark map is used as the filling mark map. If the number of points to be filled is greater than zero, it means that there are points to be filled in the first mark map, and the points to be filled with flags equal to 2 to 4 in the first mark map need to be filled. In this embodiment, the flag of the point to be filled is set to 16.

It is understandable that the flag of the point to be filled can also be set to other values as long as it can uniquely identify the point to be filled after being filled.

S123, updating the filled first mark map to the sub-pixel mark map, returning to the operation of searching for the empty points among the adjacent points of the bright point of each sub-pixel in the sub-pixel mark map according to the first direction pixel pitch and the second direction pixel pitch, and screening the empty points to obtain the points to be filled, to generate the first mark map.

In the filled first mark map, the points to be filled with flag equal to 16 are regarded as the bright points of the sub-pixel, and the first mark map at this time is updated to the sub-pixel mark map, and the operation S121 is transferred. In turn, a loop is formed to find the points to be filled in the sub-pixel mark map, and to fill the points to be filled.

S130, obtaining a target sub-pixel mark map based on the sub-pixel mark map and the filling mark map.

Finally, the sub-pixel mark map and the filling mark map are combined to obtain the target sub-pixel mark map. The target sub-pixel mark map includes the sub-pixel bright points to be filled for the points to be filled, which realizes the filling of the empty mark position caused by foreign object occlusion and pixel defect in the original image of the sub-pixel, and improves the anti-interference ability against dust, foreign object, pixel defect, or the like.

The present disclosure provide a method for marking an image position of a sub-pixel of a display screen, including: marking all the sub-pixel bright points in the original image of the sub-pixel to obtain a sub-pixel mark map; searching for points to be filled among adjacent points of the bright point of each sub-pixel in the sub-pixel mark map according to the first direction pixel pitch and the second direction pixel pitch in the original image of the sub-pixel, filling the points to be filled to obtain a filling mark map; and obtaining the target sub-pixel mark map based on the sub-pixel mark map and the filling mark map. The embodiment of the present disclosure does not require the assistance of the positioning map, which reduces the use difficulty and the workload of operation, and by filling in the points to be filled adjacent to the bright points of all sub-pixels in the target sub-pixel mark map into sub-pixel bright points, this embodiment realizes the filling of the empty mark positions of the sub-pixels in the original image due to foreign object occlusion and pixel dead pixels, which can accurately mark the normal sub-pixel points, the location of the sub-pixel bad points caused by foreign matter occlusion and pixel bad points, and improve the anti-interference ability against dust, foreign objects, pixel bad points, or the like. In addition, this embodiment can also reduce the risk of sub-pixel positioning errors in subsequent AOI bright and dark point detection and optical extraction compensation.

Figure 3:
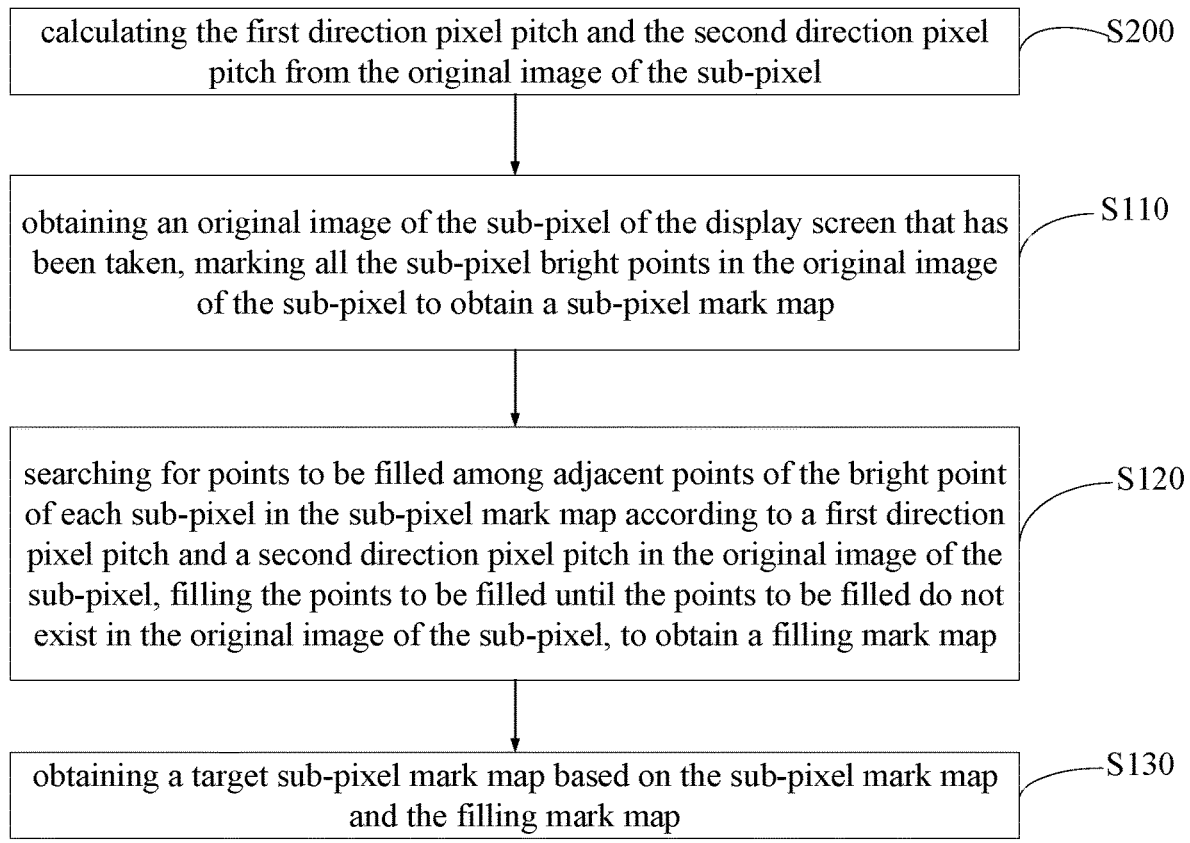
FIG. 3 is a flowchart of a method for marking an image position of a sub-pixel of a display screen according to a second embodiment of the present disclosure.

As shown in FIG. 3, based on the same inventive concept, the present disclosure also provides a second embodiment, which is based on the first embodiment.

The Second Embodiment

In this embodiment, the method for marking the image position of the sub-pixel of the display screen further includes:

S200, calculating the first direction pixel pitch and the second direction pixel pitch from the original image of the sub-pixel.

Specially, operation S200 includes:

S210, preprocessing the original image of the sub-pixels to obtain a pixel area map meeting row and column distribution characteristics of the sub-pixel.

A square pixel area map that can contain typical sub-pixel row and column distribution characteristics is selected. The number of sub-pixels in the square pixel area map is preferably 2 to the power of n to improve the calculation efficiency. The recommended value is $2^8$ (256).

S220, performing Fourier transform and decentralization processing on the pixel area map to obtain a target spectrogram.

Then, a two-dimensional discrete Fourier transform is performed on the sub-image of the pixel area map, and the calculation formula is as follows:

$$f(x, y) = \frac{1}{MN} \sum_{\mu=0}^{M-1} \sum_{v=0}^{N-1} F(\mu, v) e^{i 2\pi (\frac{\mu x}{M} + \frac{v y}{N})}$$

S230, performing maximum period detection on a real part of the target spectrogram to obtain the first direction pixel pitch and the second direction pixel pitch.

Specially, the method of projecting and accumulating the target spectrogram in the first direction and the second direction is as follows.

The first direction is the horizontal direction, and the second direction is the longitudinal direction. In other embodiments, it is also possible to set the first direction to be the longitudinal direction and the second direction to be the horizontal direction.

First, projection accumulation is performed in the horizontal direction to obtain the column vector $E_j$.

The calculation formula of the column vector $E_j$ is as follows:

$$E_j(i) = \sum_{j=1}^{2^n} F_m(i, j)$$

The position $P_j$ where the maximum value is located in the column vector $E_j$ is searched for.
The calculation formula of $P_j$ is as follows:

$$p_j = \text{loc}\{E_j(i) = \max(E_j)\}$$

$P_j$ is used to calculate the detection result $Y_{Pitch}$ of the longitudinal spatial distribution period. The calculation formula of $Y_{Pitch}$ is as follows:

$$Y_{pitch} = \frac{2^n}{2^{n-1} - p_i}$$

Then, projection accumulation is performed in the longitudinal direction to obtain the row vector $E_i$.
The calculation formula of the column vector $E_i$ is as follows:

$$E_i(j) = \sum_{i=1}^{2^n} F(i, j)$$

The position $p_i$ where the maximum value is located in the row vector $E_i$ is searched for.
The calculation formula of $p_i$ is as follows:

$$p_i = \text{loc}\{E_i(i) = \max(E_i)\}$$

$p_i$ is used to calculate the detection result $X_{Pitch}$ of the horizontal spatial distribution period. The calculation formula of $X_{Pitch}$ is as follows:

$$X_{pitch} = \frac{2^n}{2^{n-1} = p_i}$$

It should be noted that the maximum position of the target spectrogram after Fourier transform in the horizontal and vertical projections is the frequency position, and the reciprocal of the frequency is the period. Therefore, $X_{Pitch}$ and $Y_{Pitch}$ correspond to the horizontal and vertical spatial periods of the target spectrogram, respectively. In this embodiment, the horizontal spatial period of the target spectrogram is regarded as the first direction pixel pitch of the sub-pixel original image, and the vertical spatial period of the target spectrogram is regarded as the second direction pixel pitch of the sub-pixel original image. In this embodiment, the first direction pixel pitch and the second direction pixel pitch are automatically detected according to the spectrum analysis method.

This embodiment provides an algorithm for automatically detecting the pixel pitch of a display screen image, which can automatically extract the pixel pitch of the display screen pixel processing process. The algorithm is general, and it can be processed in different areas, or the entire display area of the display screen can be used for global processing. The pixel pitch obtained is a floating point number, which can be selected according to the actual situation. In addition, this method is suitable for any arrangement of sub-pixels of the display screen with rows and columns periodically distributed, while the traditional positioning map marking method needs to modify the position marking algorithm according to the difference of the sub-pixel arrangement. In this embodiment, the method of calculating the first direction pixel pitch and the second direction pixel pitch from the original image of the sub-pixels has a wider application range. Operation S200 is a step of preparing initial data, which clarifies the source of obtaining the first direction pixel pitch and the second direction pixel pitch of the initial data and is the basis for the subsequent steps.

The present disclosure further provides a non-transitory computer readable storage medium, the non-transitory computer readable storage medium stores one or more programs, the one or more programs are executed by one or more processors to implement the operations of the method for marking the image position of the sub-pixel of the display screen as described above.

Those skilled in the art should understand that the embodiments of the present disclosure can be provided as a method, a system, or a computer program product. Therefore, the present disclosure can adopt the form of a complete hardware embodiment, a complete software embodiment, or an embodiment combining software and hardware. Moreover, the present disclosure can adopt the form of a computer program product implemented on one or more computer-usable storage media (including but not limited to disk storage, CD-ROM, optical storage, etc.) containing computer-usable program codes.

The present disclosure is described with reference to flowcharts and/or block diagrams of methods, devices (systems), and computer program products according to embodiments of this application. It should be understood that each process and/or block in the flowchart and/or block diagram, and the combination of processes and/or blocks in the flowchart and/or block diagram can be realized by computer program instructions. These computer program instructions can be provided to the processor of a general-purpose computer, a special-purpose computer, an embedded processor or other programmable data processing equipment to produce a machine, such that the instructions executed by the processor of the computer or other programmable data processing equipment are caused to generate means for implementing the functions specified in one or more processes in the flowchart and/or one block or more in the block diagram.

These computer program instructions can also be stored in a computer-readable memory that can guide a computer or other programmable data processing equipment to work in a specific manner, such that the instructions stored in the computer-readable memory are caused to produce an article of manufacture including an instruction device, which implements the function specified in one process or multiple processes in the flowchart and/or one block or multiple blocks in the block diagram.

These computer program instructions can also be loaded on a computer or other programmable data processing equipment, so that a series of operation steps are executed on the computer or other programmable equipment to produce computer-implemented processing, thereby, the instructions executed on the computer or other programmable devices provide steps for implementing the functions specified in one or more processes in the flowchart and/or one block or more in the block diagram.

It should be noted that in the claims, any reference signs located between parentheses should not be constructed as limitations on the claims. The word "comprising" does not exclude the presence of parts or steps not listed in the claims. The word "a" or "an" preceding a component does not exclude the presence of multiple such components. The present disclosure can be realized by means of hardware including several different components and by means of a suitably programmed computer. In the unit claims enumerating several devices, several of these devices may be embodied in the same hardware item. The use of the words first, second, and third, etc. do not indicate any order. These words can be interpreted as names.

Although the preferred embodiments of the present disclosure have been described, those skilled in the art can make additional changes and modifications to these embodiments once they learn the basic creative concept. Therefore, the appended claims are intended to be interpreted as including the preferred embodiments and all changes and modifications falling within the scope of the present disclosure.

Obviously, those skilled in the art can make various changes and modifications to the present disclosure without departing from the spirit and scope of the present disclosure. In this way, if these modifications and variations of the present disclosure fall within the scope of the claims of the present disclosure and their equivalent technologies, the present disclosure is also intended to include these modifications and variations.

What is claimed is:

1. A method for marking an image position of a sub-pixel of a display screen, comprising:
   obtaining an original image of the sub-pixel of the display screen that has been taken, and performing average filtering and binarization processing on the original image of the sub-pixel to obtain a first image with noise removed;
   performing a first local threshold segmentation on the original sub-pixel image to obtain a second image with an interference pixel removed; the interference pixel comprising at least one of a dust-covered point and a defective pixel point;
   performing a first convolution operation and a second local threshold segmentation on the original image of the sub-pixel to obtain a third image with specific morphological characteristics;
   performing a second convolution operation and a third local threshold segmentation on the original image of the sub-pixel to obtain a fourth image with specific morphological characteristics;
   performing a second convolution operation and a local maximum mark on the original image of the sub-pixel to obtain a fifth image;
   performing an intersection operation on the first image, the second image, the third image, and the fourth image to obtain an intermediate image with specific morphological characteristics that removes noise and the interference pixel;
   performing an intersection operation on the intermediate image and the fifth image to obtain a sub-pixel mark map that comprises all sub-pixel bright points;
   searching for points to be filled among adjacent points of the bright point of each sub-pixel in the sub-pixel mark map according to a first direction pixel pitch and a second direction pixel pitch in the original image of the sub-pixel, filling the points to be filled until the points to be filled do not exist in the original image of the sub-pixel, to obtain a filling mark map; and
   obtaining a target sub-pixel mark map based on the sub-pixel mark map and the filling mark map.

2. The method of claim 1, wherein the adjacent points of the bright point of the sub-pixel comprise adjacent points that are separated from the bright point of the sub-pixel by the first direction pixel pitch in the first direction, and adjacent points that are separated from the bright point of the sub-pixel by the second direction pixel pitch in the second direction; the first direction is perpendicular to the second direction.

3. The method of claim 1, further comprising:
   calculating the first direction pixel pitch and the second direction pixel pitch from the original image of the sub-pixel.

4. The method of claim 3, wherein the operation of calculating the first direction pixel pitch and the second direction pixel pitch from the original image of the sub-pixel comprises:
   preprocessing the original image of the sub-pixels to obtain a pixel area map meeting row and column distribution characteristics of the sub-pixel;
   performing Fourier transform and decentralization processing on the pixel area map to obtain a target spectrogram; and
   performing maximum period detection on a real part of the target spectrogram to obtain the first direction pixel pitch and the second direction pixel pitch.

5. The method of claim 2, wherein the operation of searching for points to be filled among adjacent points of the bright point of each sub-pixel in the sub-pixel mark map according to a first direction pixel pitch and a second direction pixel pitch in the original image of the sub-pixel, filling the points to be filled until the points to be filled do not exist in the original image of the sub-pixel, to obtain a filling mark map comprises:
   searching for empty points among the adjacent points of the bright point of each sub-pixel in the sub-pixel mark map according to the first direction pixel pitch and the second direction pixel pitch, and screening the empty points to obtain the points to be filled, to generate a first mark map;
   if a number of points to be filled is less than or equal to zero, using the first mark map as the filling mark map; if the number of points to be filled is greater than zero, filling the points to be filled in the first mark map, and using the filled point as the bright point of the sub-pixel; and
   updating the filled first mark map to the sub-pixel mark map, returning to the operation of searching for the empty points among the adjacent points of the bright point of each sub-pixel in the sub-pixel mark map according to the first direction pixel pitch and the second direction pixel pitch, and screening the empty points to obtain the points to be filled, to generate the first mark map.

6. The method of claim 5, wherein the operation of screening the empty points to obtain the points to be filled comprises:
   marking the empty points with the number of bright points of 2 to 4 in the sub-pixel adjacent to the empty points in the first direction and the second direction as the points to be filled; and marking the empty points with the number of bright point of 1 in the sub-pixel adjacent to the empty points in the first direction and the second direction as the points not to be filled.

7. The method of claim 1, wherein the operation of obtaining a target sub-pixel mark map based on the sub-pixel mark map and the filling mark map comprises:
performing a union operation on the sub-pixel mark map and the filling mark map to obtain the target sub-pixel mark map.

8. A device for marking an image position of a sub-pixel of a display screen, comprising a processor, a memory electrically connected to the processor, and a program for marking the image position of the sub-pixel of the display screen stored on the memory and executable on the processor, when the program is executed by the processor, the operations of the method for marking the image position of the sub-pixel of the display screen of claim 1 are implemented.

9. A non-transitory computer readable storage medium, wherein the non-transitory computer readable storage medium stores one or more programs, the one or more programs are executed by one or more processors to implement the operations of the method for marking the image position of the sub-pixel of the display screen of claim 1.

\* \* \* \* \*